(12) United States Patent
Takahashi et al.

(10) Patent No.: US 9,167,653 B2
(45) Date of Patent: Oct. 20, 2015

(54) POWER SUPPLY DEVICE AND LUMINAIRE (71) Applicant: Toshiba Lighting & Technology Corporation, Kanagawa (JP)

(72) Inventors: Koji Takahashi, Kanagawa (JP); Hiromichi Nakajima, Kanagawa (JP); Kenji Sakai, Kanagawa (JP); Hiroyuki Kudo, Kanagawa (JP); Hirokazu Otake, Kanagawa (JP); Hiroshi Terasaka, Kanagawa (JP); Kiyoteru Kosa, Kanagawa (JP); Yosuke Saito, Kanagawa (JP); Masatoshi Kumagai, Kanagawa (JP); Shinichiro Matsumoto, Kanagawa (JP); Hideo Kozuka, Kanagawa (JP); Kazuhiko Sato, Kanagawa (JP); Tatsuya Konishi, Kanagawa (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 309 days.

(21) Appl. No.: 13/828,515

(22) Filed: Mar. 14, 2013

(65) Prior Publication Data
US 2014/0084813 A1    Mar. 27, 2014

(30) Foreign Application Priority Data

Sep. 24, 2012   (JP) .................. 2012-210226

(51) Int. Cl.
*H05B 37/00* (2006.01)
*H05B 33/08* (2006.01)
(52) U.S. Cl.
CPC ........ *H05B 33/0851* (2013.01); *H05B 33/0815* (2013.01); *H05B 33/0854* (2013.01); *Y02B 20/347* (2013.01)

(58) Field of Classification Search
CPC ....................................... H05B 37/02
USPC .................. 315/291, 294, 301, 307
See application file for complete search history.

(56) References Cited

U.S. PATENT DOCUMENTS

| 8,513,902 B2 * | 8/2013 | Ohtake et al. ................. 315/307 |
| 2010/0219764 A1 * | 9/2010 | Yamasaki et al. ............. 315/224 |

(Continued)

FOREIGN PATENT DOCUMENTS

| EP | 2 214 457 A1 | 8/2010 |
| EP | 2 257 130 A1 | 12/2010 |

(Continued)

OTHER PUBLICATIONS

European Search Report dated Mar. 14, 2014 for Application No. 13 15 9525.

*Primary Examiner* — Hai L Nguyen
(74) *Attorney, Agent, or Firm* — Ulmer & Berne LLP (57) ABSTRACT

A power supply device includes a control circuit and a first circuit. The control circuit switches between a current control mode and a voltage control mode according to an inputted dimming signal and thus dims a light-emitting element. In the current control mode the control circuit controls an output current supplied to the light-emitting element to a target current, and in the voltage control mode the control circuit controls an output voltage supplied to the light-emitting element to a target voltage. The first circuit detects the output current and the output voltage, and sets the target voltage at which switching between the current control mode and the voltage control mode is carried out as a first voltage.

18 Claims, 3 Drawing Sheets

(56) References Cited

U.S. PATENT DOCUMENTS

2011/0057576 A1* 3/2011 Otake et al. .................. 315/291
2013/0127356 A1* 5/2013 Tanaka et al. ............. 315/200 R

FOREIGN PATENT DOCUMENTS

| JP | 2009-232623 | 10/2009 |
| WO | 2011/065047 A1 | 6/2011 |

* cited by examiner

POWER SUPPLY DEVICE AND LUMINAIRE

CROSS-REFERENCE TO RELATED APPLICATIONS

This application is based upon and claims the benefit of priority from the prior Japanese Patent Application No. 2012-210226, filed on Sep. 24, 2012; the entire contents of which are incorporated herein by reference.

FIELD

Embodiments described herein relate generally to a power supply device and a luminaire.

BACKGROUND

Recently, as illumination light sources in luminaires, more and more incandescent lamps and fluorescent lamps are being replaced by energy-saving long-life light sources, for example, light-emitting diode (LED). Also, new illumination light sources, for example, electro-luminescence (EL) and organic light-emitting diode (OLED), are being developed. Since light output of these illumination light sources depends on the value of a current flowing therein, a lighting circuit capable of controlling the current value supplied is necessary in order to light and dim the illumination light source. For example, a power supply device which lights a light-emitting diode needs to control the current over a broad range from a maximum current to fully light the light-emitting diode to a minimum current value of zero to turn off the light.

However, at the time of deep dimming which is close to light-off state, the current value becomes very small and detection error increases. Also, since the properties of light-emitting diode varies depending on manufacturing variance, temperature dependence and the like, smooth dimming from full lighting to deep dimming and then to light-off cannot be carried out in some cases.

DETAILED DESCRIPTION

In general, according to one embodiment, a power supply device includes a control circuit and a first circuit. The control circuit switches between a current control mode and a voltage control mode according to an inputted dimming signal and thus dims a light-emitting element. In the current control mode the control circuit controls an output current supplied to the light-emitting element to a target current, and in the voltage control mode the control circuit controls an output voltage supplied to the light-emitting element to a target voltage. The first circuit detects the output current and the output voltage, and sets the target voltage at which switching between the current control mode and the voltage control mode is carried out as a first voltage.

Hereinafter, an embodiment will be described in detail with reference to the drawings. In this specification and the drawings, the same elements as described in already mentioned drawings are denoted by the same reference numerals and detailed explanation thereof is omitted appropriately. Also, in the specification, the term "dimming degree" means the ratio of light output at the time of dimming to light output at the time of full lighting. The dimming degree of 100% is equivalent to full lighting. The dimming degree of 0% is equivalent to the light output when the light is off.

First Embodiment

Figure 1:
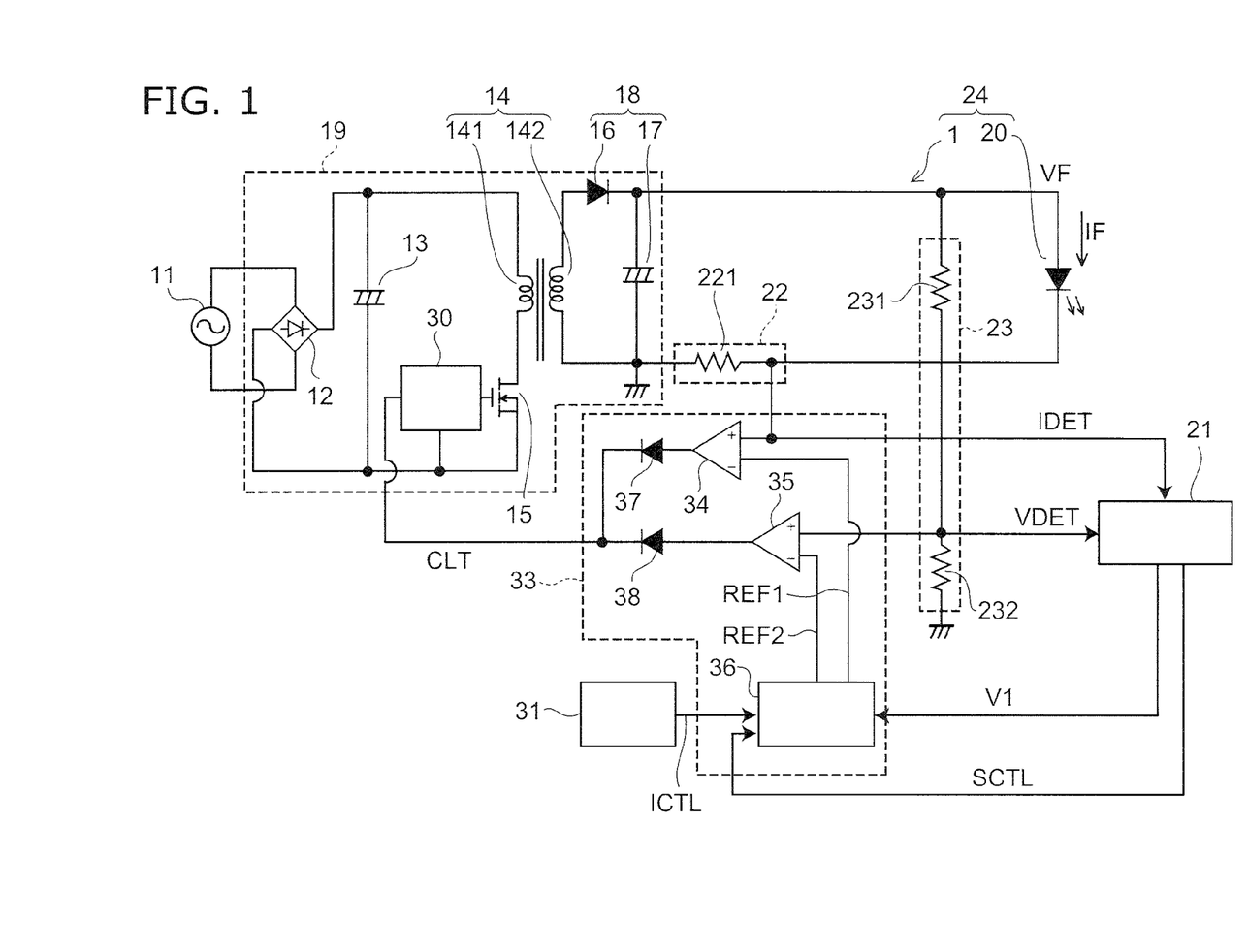
FIG. 1 is a circuit diagram illustrating a luminaire including a power supply device according to a first embodiment.

FIG. 1 is a circuit diagram illustrating a luminaire including power supply device according to a first embodiment.

A luminaire 24 of the first embodiment includes a light-emitting element 20 and a power supply device 1. The power supply device 1 includes a DC power supply circuit 19, a first circuit 21, a current detection circuit 22, a voltage detection circuit 23, and a control circuit 33. The power supply device 1 is a power supply device which controls an output current IF and an output voltage VF supplied to the light-emitting element 20 according to a control signal CTL and thus dims the light.

The DC power supply circuit 19 includes a rectifying circuit 12, a capacitor 13, a transformer 14, a switching element 15, a rectifying and smoothing circuit 18, and a drive circuit 30. The DC power supply circuit 19 converts an AC voltage supplied from an AC power supply 11 to a DV voltage. The AC power supply 11 is, for example, a commercial power supply.

The rectifying circuit 12 is, for example, a diode bridge and has an input terminal connected to the AC power supply 11. The capacitor 13 is connected to an output terminal of the rectifying circuit 12. A DC voltage formed by smoothing an AC voltage is outputted at both ends of the capacitor 13.

The transformer 14 includes a primary winding 141 and a secondary winding 142. The primary winding 141 is connected to both ends of the capacitor 13 via the switching element 15.

The switching element 15 is, for example, an FET. The control terminal of the switching element 15 is controlled by the control circuit 33 via the drive circuit 30.

The secondary winding 142 is connected to the rectifying and smoothing circuit 18 formed by a rectifying element 16 and a capacitor 17. The rectifying and smoothing circuit 18 converts an AC voltage inducted in the secondary winding 142 to a DC voltage.

The light-emitting element 20 is, for example, a light-emitting diode (LED) and is connected to the output of the rectifying and smoothing circuit 18, that is, to both ends of the capacitor 17 via the current detection circuit 22. The light-emitting element 20 is supplied with the output current IF and the output voltage VF and thus emits light. Although the configuration using the light-emitting element 20 as an illumination load in the power supply device 1 is illustrated as an example, the number of light-emitting elements and the configuration thereof or the like may be arbitrary and can be formed according to light output or the like.

The current detection circuit 22 includes, for example, a resistor 221 and is connected in series to the light-emitting element 20. The current detection circuit 22 detects the output current IF flowing through the light-emitting element 20 and outputs a detection value IDET that is a voltage proportional to the output current IF.

The voltage detection circuit 23 includes, for example, splitting resistors 231, 232 and is connected between the light-emitting element 20 and the ground. The voltage detection circuit 23 detects the output voltage VF supplied to the light-emitting element 20 and outputs a detection value VDET that is a voltage proportional to the output voltage VF.

The control circuit 33 includes comparator circuits 34, 35, diodes 37, 38, and a reference signal generating circuit 36. The control circuit 33 takes in the detection values IDET, VDET, dimming signals ICTL, SCTL, and a first voltage V1, and outputs the control signal CTL, thus controlling the switching element 15 via the drive circuit 30.

Here, the first voltage V1 is a target voltage of the output voltage VF supplied to the light-emitting element 20 when the control circuit 33 switches between a current mode and a voltage mode. The first voltage V1 is generated by the first circuit 21.

The comparator circuit 34 compares the detection value IDET with a first reference signal REF1. When the detection value IDET is larger than the first reference signal REF1, the comparator circuit 34 outputs a high level. When the detection value IDET is smaller than the first reference signal REF1, the comparator circuit 34 outputs a low level.

The comparator circuit 35 compares the detection value VDET with a second reference signal REF2. When the detection value VDET is larger than the second reference signal REF2, the comparator circuit 35 outputs a high level. When the detection value VDET is smaller than the second reference signal REF2, the comparator circuit 35 outputs a low level.

The anode of the diode 37 is connected to the output of the comparator circuit 34. The anode of the diode 38 is connected to the output of the comparator circuit 35. The cathode of the diode 37 and the cathode of the diode 38 are connected to each other and are connected to the drive circuit 30.

The reference signal generating circuit 36 takes in the dimming signal ICTL from a dimming operation unit 31, takes in the dimming signal SCTL and the first voltage V1 from the first circuit 21, and outputs the first reference signal REF1 and the second reference signal REF2.

Figure 2:
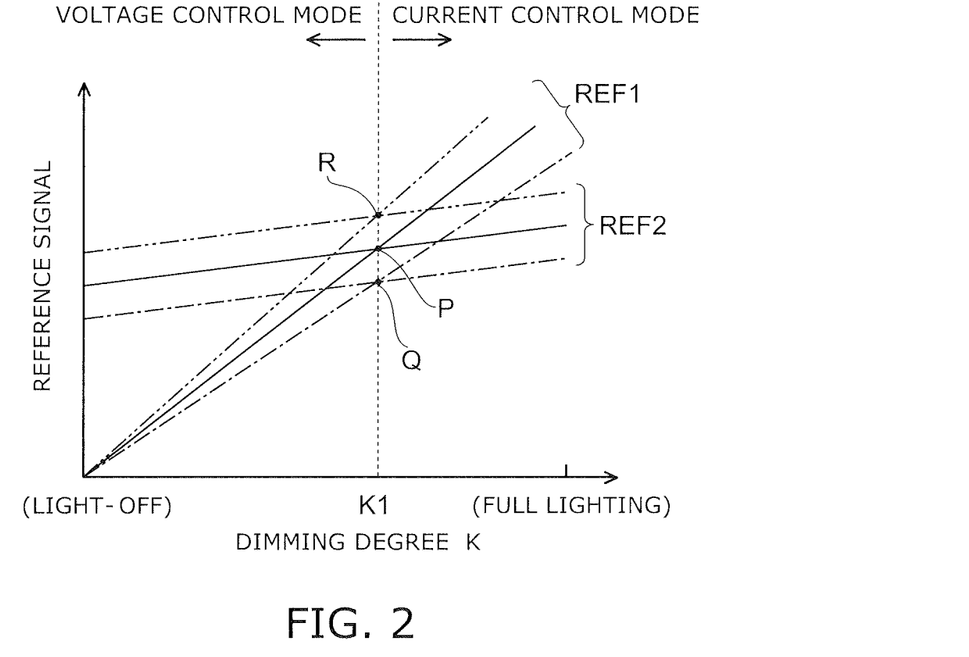
FIG. 2 is a graph illustrating a reference signal according to the first embodiment.

FIG. 2 is a graph illustrating the reference signals in the first embodiment.

The first reference signal REF1 and the second reference signal REF2 are signals that change respectively according to the dimming signal ICTL indicating the dimming degree K. The first reference signal REF1 is generated, for example, as a signal proportional to the dimming degree K. Corresponding to the output voltage VF taking a finite value when the dimming degree K is 0% (when light is off), the second reference signal REF2 is generated as a signal that takes a finite value when the dimming degree K is 0% and that changes in proportion to change in the dimming degree.

Therefore, when the dimming degree K is a predetermined value K1, the first reference signal REF1 and the second reference signal REF2 are equal. When the dimming degree K is smaller than the predetermined value K1, the second reference signal REF2 is larger than the first reference signal REF1. When the dimming degree K is larger than the predetermined value K1, the first reference signal REF1 is larger than the second reference signal REF2.

In FIG. 2, three signals passing through points P, Q and R are shown as examples of the first reference signal REF1 and the second reference signal REF2. These signals represent a signal corresponding to the light-emitting element 20 as a predetermined reference (for example, passing through the point P) and signals corrected by the first circuit 21 (for example, passing through the points Q and R), as described with reference to FIG. 3.

Figure 3:
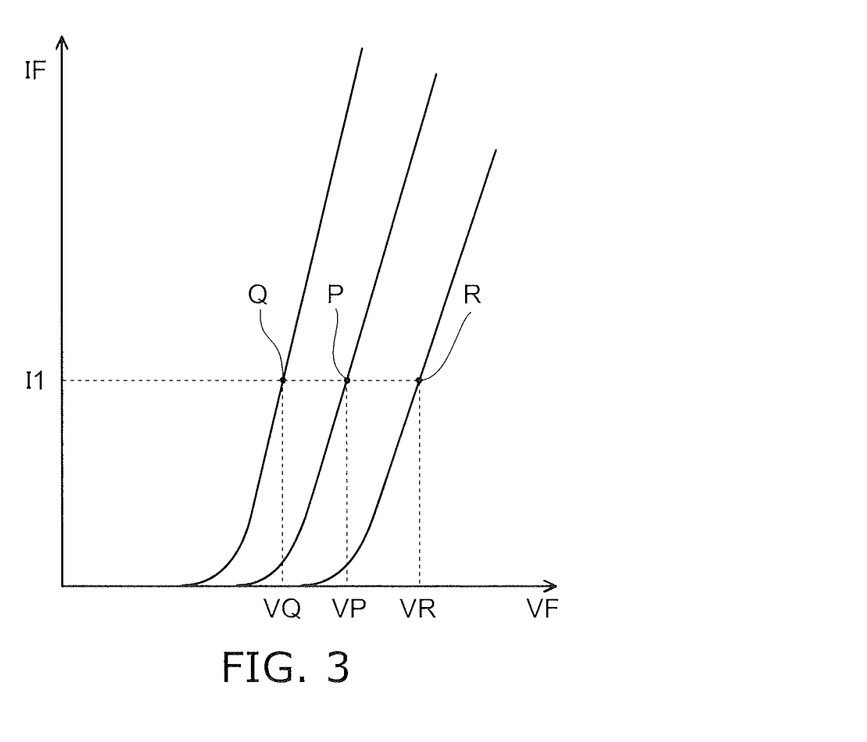
FIG. 3 is a graph showing an output current IF in relation to an output voltage VF supplied to a light emitting element.

FIG. 3 is a graph showing the output current IF in relation to the output voltage VF supplied to the light-emitting element 20.

If the light-emitting element 20 is, for example, an LED, the output current IF shows a non-linear characteristic that is convex downward in relation to the output voltage VF. Therefore, for example, if the first reference signal REF1 and the second reference signal REF2 are set to be equal at an operation point P, in an area where the output voltage VF is greater than at the operation point P (current control area), the change in the output current IF is greater than the change in the output voltage VF. Meanwhile, in an area where the output voltage VF is smaller than at the operation point P (voltage control area), the change in the output voltage VF is greater than the change in the output current IF.

Therefore, in the area where the output voltage VF is greater than at the operation point P, the detection value IDET outputted from the current detection circuit 22 is greater than the detection value VDET outputted from the current detection circuit 23. The control circuit 33 preferentially outputs the output of the comparator circuit 34 over the output of the comparator circuit 35, as the control signal CTL. Consequently, the control circuit 33 enters the current control mode in which the control circuit 33 turns the switching element 15 on or off via the drive circuit 30 and controls the detection value IDET to a predetermined target current based on the first reference signal REF1.

Meanwhile, in the area where the output voltage VF is smaller than at the operation point P, the detection value VDET outputted from the current detection circuit 23 is greater than the detection value IDET outputted from the current detection circuit 22. The control circuit 33 preferentially outputs the output of the comparator circuit 35 over the output of the comparator circuit 34, as the control signal CTL. Consequently, the control circuit 33 enters the voltage control mode in which the control circuit 33 turns the switching element 15 on or off via the drive circuit 30 and controls the detection value VDET to a predetermined target voltage based on the second reference signal REF2.

Thus, in the area where the output current IF is relatively small and the change in the output voltage VF is greater than the change in the output current IF, the control circuit 33 controls the output voltage VF to a predetermined target voltage, using the second reference signal REF2 as the reference signal. Also, in the area where the output current IF is relatively large and the change in the output current IF is greater than the change in the output voltage VF, the control circuit 33 controls the output current IF to a predetermined target current, using the first reference signal REF1 as the reference signal.

Therefore, with respect to the light-emitting element 20 having predetermined properties, the output current IF can be stably changed from a small-value area near zero to a rated value, and the dimming degree K can be stably adjusted from 0% to 100%.

Meanwhile, the light-emitting element 20 has manufacturing variance or the like, which causes difference between elements in the characteristic of the output current IF in relation to the output voltage VF. For example, if the characteristic passing through the operation point P is considered to a central value, difference occurs within the range of characteristics passing through the operation points Q and R, as shown in FIG. 3. The operation points P, Q and R are operation points where the output voltage VF of the respective light-emitting elements is I1, and the output voltage VF at that point is VP, VQ and VR, respectively (VQ<VP<VR).

Therefore, if the output voltage VF=VP at the operation point P is fixed as the first voltage V1 which is the target voltage when the control circuit 33 switches between the current control mode and the voltage control mode, stable dimming may not be carried out if the characteristic of the light-emitting element 20 is different from the characteristic passing through the operation point P.

For example, in the case of a light-emitting element having the characteristic passing through the operation point Q, if switching between the current control mode and the voltage control mode is carried out at the output voltage VF=VP, the mode is switched at the operation point where the output current is greater than the predetermined target current and the dimming degree K is greater than the predetermined value. Therefore, the control circuit 33 enters the voltage control mode in the area where the output current IF is large, and therefore may not be able to stably dim the light-emitting element.

Also, for example, in the case of a light-emitting element having the characteristic passing through the operation point R, if switching between the current control mode and the voltage control mode is carried out at the output voltage VF=VP, the mode is switched at the operation point where the output current is smaller than the predetermined target current and the dimming degree K is smaller than the predetermined value. Therefore, the control circuit 33 enters the current control mode in the area where the output current IF is small, and therefore may not be able to stably dim the light-emitting element.

Thus, in the embodiment, the output current IF=I1 and the output voltage VF corresponding to the predetermined dimming degree K=K1 with respect to the light-emitting element 20 is detected by the first circuit 21, and the first reference signal REF1 and the second reference signal REF2 are set in the control circuit 33.

The first circuit 21 is made up, for example, of a microcomputer. The first circuit 21 outputs the dimming signal SCTL to the control circuit 33, takes in the detection values IDET, VDET and detects the output current IF and the output voltage VF, thus detecting the current and voltage characteristics of the light-emitting element 20. Also, based on the detected characteristics, the target voltage of the output voltage VF supplied to the light-emitting element 20 when the control circuit 33 switches between the current mode and the voltage mode is found and outputted as the first voltage V1.

For example, in the case of the light-emitting element having the characteristic passing through the operation point Q, as shown in FIG. 3, the first circuit 21 sets the output voltage VF=VQ which provides an output current IF equal to the output current IF=I1 at the operation point P, as the first voltage V1 that is the target voltage at which switching between the current control mode and the voltage control mode is carried out.

Also, for example, in the case of the light-emitting element having the characteristic passing through the operation point R, as shown in FIG. 3, the first circuit 21 sets the output voltage VF=VR which provides an output current IF equal to the output current IF at the operation point P, as the first voltage V1 that is the target voltage at which switching between the current control mode and the voltage control mode is carried out.

The control circuit 33 switches between the current control mode and the voltage control mode at the first voltage V1 set by the first circuit 21 and thus dims the light-emitting element 20.

For example, if the first voltage is set at VQ, the control circuit 33 generates a first reference signal REF1 and a second reference signal REF2 that are equal to the first reference signal REF1 and the second reference signal REF2 at the predetermined dimming degree K=K1 (operation point Q), as shown in FIG. 2.

Also, for example, correction can be made with the first voltage VQ set by the first circuit 21, using the first reference signal REF1 and the second reference signal REF2 that pass through the operation point P as predetermined reference signals.

In FIG. 2, both the first reference signal REF1 and the second reference signal REF2 are changed by correction or setting, according to the first voltage V1. However, a configuration in which only one of these reference signals is changed can be employed. For example, a configuration in which only the second reference signal REF2 is changed can be employed though the dimming degree K at which switching between the current control mode and the voltage control mode is carried out shifts slightly from K1.

In the embodiment, the light-emitting element is controlled, switching between the current control mode and the voltage control mode. With the first voltage, which is the target voltage at which the control mode is switched, the characteristic of the light-emitting element is detected and the reference signal is set or corrected. Consequently, unstable control caused by a shift of the operation point due to the manufacturing variance of the light-emitting element is eliminated and the light-emitting element can be dimmed stably. Also, light-emitting elements with different standards such as different rated currents can be dimmed stably.

Second Embodiment

Figure 4:
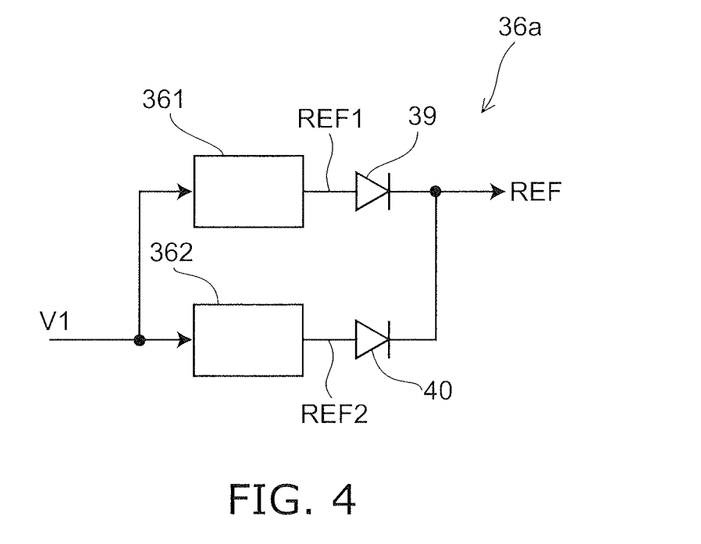
FIG. 4 is a circuit diagram illustrating a reference signal generating circuit according to a second embodiment.

FIG. 4 is a circuit diagram illustrating a reference signal generating circuit in a second embodiment.

In a power supply device of the second embodiment, the reference signal generating circuit 36 of the first embodiment is replaced by a reference signal generating circuit 36a. The other parts of the configuration than the reference signal generating circuit 36a of the second embodiment are similar to the first embodiment.

The reference signal generating circuit 36a includes a first signal generating circuit 361 which generates a first reference signal REF1, a second signal generating circuit 362 which generates a second reference signal REF2, and diodes 39, 40.

The first reference signal REF1 and the second reference signal REF2 are similar to those in the first embodiment and are set or corrected by the first circuit 21. In FIG. 4, the configuration in which the first reference signal REF1 and the second reference signal REF2 are corrected is illustrated as an example. However, a configuration in which at least one of the first reference signal REF1 and the second reference signal REF2 is corrected may be employed.

The first signal generating circuit 361 is connected to inverting input terminals of the comparator circuits 34, 35 via the diode 39. The second signal generating circuit 362 is connected to inverting input terminals of the comparator circuits 34, 35 via the diode 40.

The reference signal generating circuit 36a outputs the greater one of the first reference signal REF1 and the second reference signal REF2, as a reference signal REF.

Figure 5:
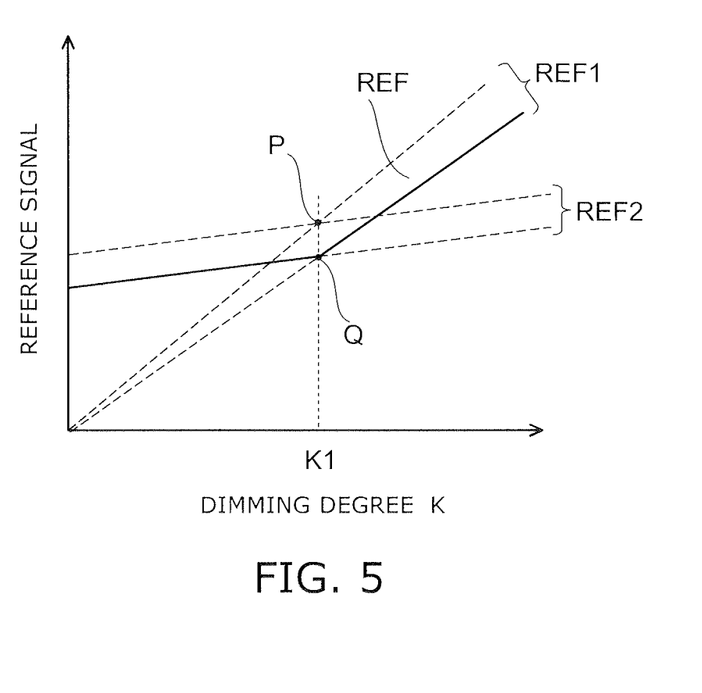
FIG. 5 is a graph illustrating a reference signal according to the second embodiment.

FIG. 5 is a graph illustrating the reference signals in the second embodiment.

As shown in FIG. 5, this embodiment differs from the first embodiment in the configuration of the reference signal generating circuit 36. In this embodiment, the reference signal generating circuit 36a is provided instead of the reference signal generating circuit 36 of the first embodiment. The other parts of the configuration than the power supply device and the reference signal generating circuit of the luminaire according to this embodiment are similar to the configuration shown in FIG. 1.

The case where the characteristic of the output current IF in relation to the output voltage VF of the light-emitting element 20 passes through the operation point Q of FIG. 3 is illustrated as an example. The first reference signal REF1 and the second reference signal REF2 are set or corrected to intersect with each other at the operation point Q where the dimming degree K=K1 holds.

Since the reference signal generating circuit 36a selectively outputs the greater one of the first reference signal REF1 and the second reference signal REF2, a reference signal REF is formed as indicated by the solid line in FIG. 5.

The control circuit 33 in this embodiment controls the output voltage VF at a predetermined target voltage in an area where the output voltage VF is smaller than a first voltage V1=VQ corresponding to the dimming degree K=K1. At this time, the second reference signal REF2 which is greater than the first reference signal REF1 is inputted as a reference signal REF to the inverting input terminal of the comparator circuit 34. Consequently, output of the high level from the comparator 34 due to noise or the like is restrained and the control circuit 33 can stably dim the light-emitting element 20 in the voltage control mode based on the output from the comparator 35.

Meanwhile, the control circuit 33 in this embodiment controls the output current IF at a predetermined target current in an area where the output voltage VF is greater than the first voltage V1. At this time, the first reference signal REF1 which is greater than the second reference signal REF2 is inputted as a reference signal REF to the inverting input terminal of the comparator circuit 35. Consequently, output of the high level from the comparator 35 due to noise or the like is restrained and the control circuit 33 can stably dim the light-emitting element 20 in the current control mode based on the output from the comparator 34.

In this embodiment, in addition to the advantages of the first embodiment, the influence of noise or the like can be restrained and the light-emitting element 20 can be dimmed more stably.

While embodiments are described above with reference to specific examples, various modifications can be made without being limited to these examples.

For example, the light-emitting element 20 may be an OLED. As the light-emitting element 20, plural light-emitting elements may be connected in series or in parallel.

The first circuit 21 may, for example, output the dimming signal SCTL in which the dimming degree K changes from 0 to 100% to the control circuit 33, take in the detection values IDET, VDET and detect the output current IF and output voltage VF, thus detecting the characteristic of the output current IF and the first voltage V1 corresponding to the output voltage VF of the light-emitting element 20.

At this time, the first circuit 21 can gradually increase the dimming degree K from 0%, control the output current IF to gradually rise from zero, detect the output voltage VF at that time, and thus detect the first voltage V1.

Also, information about the rated current equivalent to the output current IF corresponding to the dimming degree K of 100% can be held in the light-emitting element 20, and the first circuit 21 can acquire the information that is held and set the rated current of the light-emitting element 20. The rated current can also be preset as a predetermined value unique to the power supply device 1.

When the first circuit 21 can detect the rated current such as when the information about the rated current is held in the light-emitting element 20, the output current IF is gradually reduced from the output current IF equivalent to the rated current corresponding to the dimming degree K of 100% when the light is turned off, and the output voltage VF is detected from 50% of the rated current. At least one of the output current IF and the output voltage VF corresponding to the dimming degree K is found as a dimming curve and the first voltage V1 can be detected based on the resulting dimming curve.

Also, when power is turned on or when the dimming degree of 0% is canceled and the lighting is turned on, the first circuit 21 can detect the first voltage V1 by detecting the output voltage VF and the output current IF in the case where the light-emitting element 20 is lit with a lower output than a rated output for a predetermined period.

Also, when power is turned on or when the dimming degree of 0% is canceled and the lighting is turned on, the first circuit 21 can detect the first voltage V1 by detecting the output voltage VF and the output current IF in the case where the light-emitting element 20 is lit with an arbitrary output for a predetermined period.

Also, when power is turned on or when the dimming degree of 0% is canceled and the lighting is turned on, the first circuit 21 can detect the first voltage V1 by detecting the output voltage VF and the output current IF in the case where the light-emitting element 20 is lit with an output corresponding to the dimming degree K of the inputted dimming signal ICTL for a predetermined period.

The first circuit 21 can also detect the first voltage V1 by detecting the output voltage VF and the output current IF in the case where the light-emitting element 20 is lit in an inspection conducted at the time of manufacturing.

The first circuit 21 can also store the detected characteristic of the output current IF in relation to the output voltage VF of the light-emitting element 20 and the detected first voltage V1 and not change these values afterwards. Also, the stored characteristic and first voltage V1 can be initialized and set to a predetermined reference value when the light is turned off. The detected characteristic and first voltage V1 can also be updated every predetermined period.

Information about the current and voltage characteristics and the first voltage V1 can be held in the light-emitting element 20, and the first circuit 21 can acquire the information that is held and thus can set the characteristic of the light-emitting element 20 and the first voltage V1.

The information held in the light-emitting element 20 can include the rated current of the light-emitting element 20 equivalent to the output current IF corresponding to the dimming degree K of 100%. The rated current can also be preset as a predetermined value unique to the power supply device 1.

The first circuit 21 can be configured to detect the characteristic of the output current IF in relation to the output voltage VF of the light-emitting element 20 only once, or can be configured to detect the characteristic an arbitrary number of times.

Since the characteristic of the output current IF in relation to the output voltage VF of the light-emitting element 20 changes depending on the temperature of the light-emitting element 20 or the ambient temperature, the temperature can be detected to make correction.

When power is turned on or when the dimming degree of 0% is canceled and the lighting is turned on, the first circuit 21 can correct the first voltage V1 by detecting at least one of the temperature of the light-emitting element 20 and the ambient temperature in the case where the light-emitting element 20 is lit with a lower output than a rated output for a predetermined period.

Also, when power is turned on or when the dimming degree of 0% is canceled and the lighting is turned on, the first circuit 21 can correct the first voltage V1 by detecting at least one of the temperature of the light-emitting element 20 and the ambient temperature in the case where the light-emitting element 20 is lit with an arbitrary output for a predetermined period.

Also, when power is turned on or when the dimming degree of 0% is canceled and the lighting is turned on, the first circuit 21 can correct the first voltage V1 by detecting at least one of the temperature of the light-emitting element 20 and the ambient temperature in the case where the light-emitting element 20 is lit with an output corresponding to the dimming degree K of the inputted dimming signal ICTL for a predetermined period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply device comprising:
  a control circuit including:
    a reference signal generator which sets a target current and a target voltage according to an inputted dimming signal;
    a first comparator connected to the reference signal generator, comparing an output current supplied to a light-emitting element with the target current, outputting a signal in a current control mode, the control circuit controlling the output current to the target current in the current control mode; and
    a second comparator connected to the reference signal generator, comparing an output voltage supplied to the light-emitting element with the target voltage, outputting a signal in a voltage control mode, the control circuit controlling the output voltage to the target voltage in the voltage control mode,
  the control circuit switching between the current control mode and the voltage control mode by switching an output of the first comparator and an output of the second comparator according to a first voltage, the first voltage being the target voltage at which switching between the current control mode and the voltage control mode is carried out, and thus the control circuit dimming the light-emitting element according to the inputted dimming signal; and
    a microcomputer connected to the control circuit, detecting a characteristic of the output current to the output voltage, setting the first voltage, outputting the first voltage to the control circuit.

2. The power supply device according to claim 1, wherein the microcomputer sets the detected output voltage which provides the detected output current equal to a predetermined current as the first voltage.

3. The power supply device according to claim 1, wherein the microcomputer corrects the first voltage by comparing the detected output current and the output voltage with a predetermined current value and a predetermined voltage value.

4. The power supply device according to claim 3, wherein the reference signal generator generates:
  a first reference signal to control to the target current in the current control mode; and
  a second reference signal to control to the target voltage in the voltage control mode, and
  the microcomputer corrects at least one of the first and second reference signals based on the detected output current and the output voltage.

5. The power supply device according to claim 4, wherein the first reference signal is proportional to a dimming degree.

6. The power supply device according to claim 4, wherein the second reference signal takes a finite value when a dimming degree is 0%, and is proportional to a change in the dimming degree.

7. The power supply device according to claim 4, wherein the second reference signal is larger than the first reference signal when a dimming degree is smaller than a predetermined value, and
  the first reference signal is larger than the second reference signal when the dimming degree is larger than the predetermined value.

8. The power supply device according to claim 1, wherein the microcomputer changes the output current to a rated current, detects a characteristic of the output current to the output voltage, and sets the first voltage.

9. The power supply device according to claim 1, wherein the control circuit performs the voltage control mode when a dimming degree is low, and performs the current control mode when the dimming degree is high.

10. A luminaire comprising:
  a light-emitting element; and
  a power supply device including:
    a control circuit having:
      a reference signal generator which sets a target current and a target voltage according to an inputted dimming signal;
      a first comparator connected to the reference signal generator, comparing an output current supplied to a light-emitting element with the target current, outputting a signal in a current control mode, the control circuit controlling the output current to the target current in the current control mode; and
      a second comparator connected to the reference signal generator, comparing an output voltage supplied to the light-emitting element with the target voltage, outputting a signal in a voltage control mode, the control circuit controlling the output voltage to the target voltage in the voltage control mode,
    the control circuit switching between the current control mode and the voltage control mode by switching an output of the first comparator and an output of the second comparator according to a first voltage, the first voltage being the target voltage at which switching between the current control mode and the voltage control mode is carried out, and thus dimming the light-emitting element according to the inputted dimming signal; and
      a microcomputer connected to the control circuit, detecting a characteristic of the output current to the output voltage, setting the first voltage, outputting the first voltage to the control circuit.

11. The luminaire according to claim 10, wherein the microcomputer sets the detected output voltage which provides the detected output current equal to a predetermined current as the first voltage.

12. The luminaire according to claim 10, wherein the microcomputer corrects the first voltage by comparing the detected output current and the output voltage with a predetermined current value and a predetermined voltage value.

13. The luminaire according to claim 11, wherein the reference signal generator generates:
   a first reference signal to control to the target current in the current control mode; and
   a second reference signal to control to the target voltage in the voltage control mode, and
   the microcomputer corrects at least one of the first and second reference signals based on the detected output current and the output voltage.

14. The luminaire according to claim 13, wherein the first reference signal is proportional to a dimming degree.

15. The luminaire according to claim 13, wherein the second reference signal takes a finite value when a dimming degree is 0%, and is proportional to a change in the dimming degree.

16. The luminaire according to claim 13, wherein the second reference signal is larger than the first reference signal when a dimming degree is smaller than a predetermined value, and
   the first reference signal is larger than the second reference signal when the dimming degree is larger than the predetermined value.

17. The luminaire according to claim 13, wherein the microcomputer changes the output current to a rated current, detects a characteristic of the output current to the output voltage, and sets the first voltage.

18. The luminaire according to claim 10, wherein the control circuit performs the voltage control mode when a dimming degree is low, and performs the current control mode when the dimming degree is high.

* * * * *